United States Patent
Jang et al.

(10) Patent No.: US 9,976,031 B2
(45) Date of Patent: May 22, 2018

(54) RESIN COMPOSITION OF INTAKE HOSE MATERIAL FOR VEHICLE TURBO

(71) Applicants: Hyundai Motor Company, Seoul (KR); Kia Motors Corporation, Seoul (KR); KOPLA CO., LTD., Gyeonggi-do (KR)

(72) Inventors: Young-Hak Jang, Seoul (KR); Jae-Seok Lee, Gyeonggi-do (KR); Yong-Seok Jang, Gyeonggi-do (KR); Chul-Kyu Kwak, Gyeonggi-do (KR); Jae-Pil Ko, Gyeonggi-do (KR)

(73) Assignees: Hyundai Motor Company, Seoul (KR); Kia Motors Corporation, Seoul (KR); Kopla Co., Ltd., Hwaseong, Gyeonggi-Do (KR)

( * ) Notice: Subject to any disclaimer, the term of this patent is extended or adjusted under 35 U.S.C. 154(b) by 0 days. days.

(21) Appl. No.: 15/147,128

(22) Filed: May 5, 2016

(65) Prior Publication Data

US 2017/0166744 A1    Jun. 15, 2017

(30) Foreign Application Priority Data

Dec. 10, 2015   (KR) ........................ 10-2015-0176302

(51) Int. Cl.
*C08L 77/02*    (2006.01)
*C08L 21/00*    (2006.01)
(Continued)

(52) U.S. Cl.
CPC .............. *C08L 77/02* (2013.01); *C08L 21/00* (2013.01); *F02M 35/10321* (2013.01); *F02M 35/161* (2013.01)

(58) Field of Classification Search
CPC .......... C08L 77/02; C08L 21/00; C08L 23/12; F02M 35/10321; F02M 35/161
(Continued)

(56) References Cited

U.S. PATENT DOCUMENTS

2013/0096246 A1    4/2013  Walker

FOREIGN PATENT DOCUMENTS

CN    102532868 A  *  7/2012  ......... B29C 47/0011
JP    06016929 A   *  1/1994
(Continued)

OTHER PUBLICATIONS

JP 06-016929 A (1994), machine translation, JPO Japan Platform for Patent Information (J-PlatPat).*
(Continued)

*Primary Examiner* — Josephine L Chang
(74) *Attorney, Agent, or Firm* — Mintz Levin Cohn Ferris Glovsky and Popeo, P.C.; Peter F. Corless

(57) ABSTRACT

A resin composition is provided which is used as a vehicle part, for example, an intake hose material for a vehicle turbo to provide excellent durability, heat resistance, and elongation. The resin composition of the intake hose material for the vehicle turbo of the present invention includes polyamide 6, polypropylene, and an olefin elastomer rubber. The resin composition further includes an antioxidant, a heat resistance stabilizer, a lubricant, and a master batch. Accordingly, the resin composition of the present invention provides substantially improved durability, heat resistance, and elongation. In addition, mechanical rigidity and pressure resistant and cold resistant properties of the resin composition is improved, and simultaneously, a weight reduction is feasible and manufacturing cost is reduced.

8 Claims, 2 Drawing Sheets

(51) Int. Cl.
*F02M 35/16* (2006.01)
*F02M 35/10* (2006.01)

(58) Field of Classification Search
USPC .......................................................... 524/514
See application file for complete search history.

(56) References Cited

FOREIGN PATENT DOCUMENTS

| | | | |
|---|---|---|---|
| JP | 11236472 A | * | 8/1999 |
| KR | 10-1998-057315 A | | 9/1998 |
| KR | 10-0517016 B1 | | 9/2005 |
| KR | 10-0817012 B1 | | 3/2008 |
| KR | 10-1349164 B1 | | 1/2014 |
| KR | 2015-0086504 A | | 7/2015 |

OTHER PUBLICATIONS

JP 11-236472 A (1999), machine translation, JPO Japan Platform for Patent Information (J-PlatPat).*
CN 102532868 A (2012), machine translation, Google Patents.*

* cited by examiner

RESIN COMPOSITION OF INTAKE HOSE MATERIAL FOR VEHICLE TURBO

CROSS-REFERENCE TO RELATED APPLICATIONS

This application claims priority under 35 U.S.C. § 119 to Korean Patent Application No. 10-2015-0176302, filed on Dec. 10, 2015, in the Korean Intellectual Property Office, the disclosure of which is incorporated herein by reference in its entirety.

BACKGROUND OF THE INVENTION

1. Field of the Invention

The present invention relates to a resin composition for a vehicle part, of an intake hose material for a vehicle turbo, and more particularly, to a resin composition of an intake hose material for a vehicle turbo having improved durability, heat resistance, and elongation.

2. Description of the Related Art

In general, to operate an engine of a vehicle, fuel and air are required and the engine receives cold air from the outside of the vehicle through an intake system. Further, an air intake hose mounted in an engine room of the vehicle operates as a path of transporting air suctioned from the exterior of the vehicle to an air filter or transporting filtered clean air from the air filter to a throttle body of the vehicle engine, and also operates to absorb vibration by the vehicle engine.

The air intake hose is formed using a material for preventing a heat damage problem caused by a heat source of the engine. Particularly, for a diesel engine or a turbo charger engine, engine heat may be substantially high compared to a general gasoline engine. Accordingly, a material that does not cause the heat damage problem is required.

In the related art, an acrylate ethylene methyl (AEM) material has been used for the intake hose and a clamp ring has been used at a connection portion. However, since a weight and specific gravity thereof are high, a weight reduction may not be attained. Further, the material may have substantially high associated hosts.

Therefore, there is a demand for development of an air intake hose material that prevents heat damage at a contact portion of an engine and reduces a weight by forming an intake hose using a lightweight material thereby improving fuel efficiency of a vehicle and simultaneously reducing a manufacturing cost.

SUMMARY OF THE INVENTION

The present invention provides a resin composition, which may be used for an intake hose material for a vehicle turbo. The resin composition may provide substantially improved mechanical rigidity and heat resistance, and simultaneously may be reduced in weight of the intake hose for the turbo, as compared to the material in the related art. In addition, the resin composition may provide substantially improved durability and reduce weight thereof such that fuel efficiency of the vehicle may be substantially improved and simultaneously primary cost may be reduced. Further, by using the resin composition, a balance of heat resistance and an elongation property may be optimized, and pressure resistant and cold resistant properties may be improved through an additional function of a functional additive.

Technical objects of the present invention are not limited to the technical objects described above, and other technical objects that are not described will be clearly understood by a person skilled in the art from the description of the present invention below.

In one aspect, the present disclosure provides a resin composition for an intake hose.

In an exemplary embodiment, the resin composition may comprise polyamide 6, polypropylene, and an olefin elastomer rubber.

The "polyamide 6", which is also known as nylon 6, may be a polymer formed by polymerization of monomers (e.g. caprolactam) having amide and 6 carbons. The polyamide 6 may be a homopolymer containing homogenous component of the monomers, or include substantial amount of the caprolactam, for example, greater than about 50%, 60%, 70%, 80%, 90%, 95%, or 99% of the total polymer components. For example, the polyamide 6 may be dominantly formed by ring-opening polymerization of caprolactam.

For example, the polyamide 6, as used herein, may have a glass transition temperature of about 47° C., a heat distortion temperature (HDT) of about 75° C., and a melting temperature of about 220° C.

The polypropylene as used herein may be a polymer comprising propylene monomers. For example, the polypropylene may be a homopolymer or contain substantial amount of propylene, for example, greater than about 50%, 60%, 70%, 80%, 90%, 95%, or 99% of the total polymer components.

The olefin elastomer rubber as used herein may be a polymer produced from monomers of simple olefin or alkene, for example, alkene containing 1-12 carbons. The olefin elastomer rubber may be a homopolymer or include substantial amount of olefin, for example, greater than about 50%, 60%, 70%, 80%, 90%, 95%, or 99% of the total polymer components.

In particular, a content of polyamide 6 may be of about 30 to 50 wt % based on the total weight of the resin composition. A content of polypropylene is about 10 to 20 wt % based on the total weight of the resin composition. A content of the olefin elastomer rubber may be of about 30 to 50 wt % based on the total weight of the resin composition.

In an exemplary embodiment of the present invention, the resin composition may comprise polyamide 6, polypropylene, and the olefin elastomer rubber, as described above. The resin composition may further comprise an antioxidant. The antioxidant may include a phenol-based antioxidant and a phosphorus-based antioxidant. For example, the antioxidant may include a mixture of phenolic and phosphite.

In particular, a content of the phenol-based antioxidant and the phosphorus-based antioxidant may be of about 0.3 to 0.5 wt % based on the total weight of the resin composition.

In an exemplary embodiment of the present invention, the resin composition may comprise polyamide 6, polypropylene, and the olefin elastomer rubber, as described above. The resin composition may further comprise a sulfur-based heat resistance stabilizer. For example, the sulfur-based heat resistance stabilizer may be thioester or derivatives thereof.

In particular, a content of the sulfur-based heat resistance stabilizer may be of about 1 to 2 wt % based on the total weight of the resin composition.

In an exemplary embodiment of the present invention, the resin composition may comprise polyamide 6, polypropylene, and the olefin elastomer rubber, as described above. The resin composition may further comprise an olefin-based lubricant. In particular, a content of the olefin-based lubricant may be of about 0.2 to 0.5 wt % based on the total weight of the resin composition.

According to various exemplary embodiments, the resin composition may be used as the intake hose material for the vehicle turbo. As being compared to the material in the related art, the resin composition of the present invention may provide substantially improved mechanical rigidity and heat resistance. Simultaneously, the resin compositor may improve fuel efficiency by reducing weight, and manufacturing cost may also be reduced.

Further, according to the present invention, as compared to the material in the related art, the resin composition may optimize a balance of heat resistance and an elongation property thereof and improve pressure resistant and cold resistant properties through an additional function of a functional additive.

Further provided in the present invention is a vehicle part that may comprise a resin composition as described herein. For example, the vehicle part may be an intake hose.

Other aspects of the invention are disclosed infra.

DETAILED DESCRIPTION OF THE EMBODIMENTS

Figure 1:
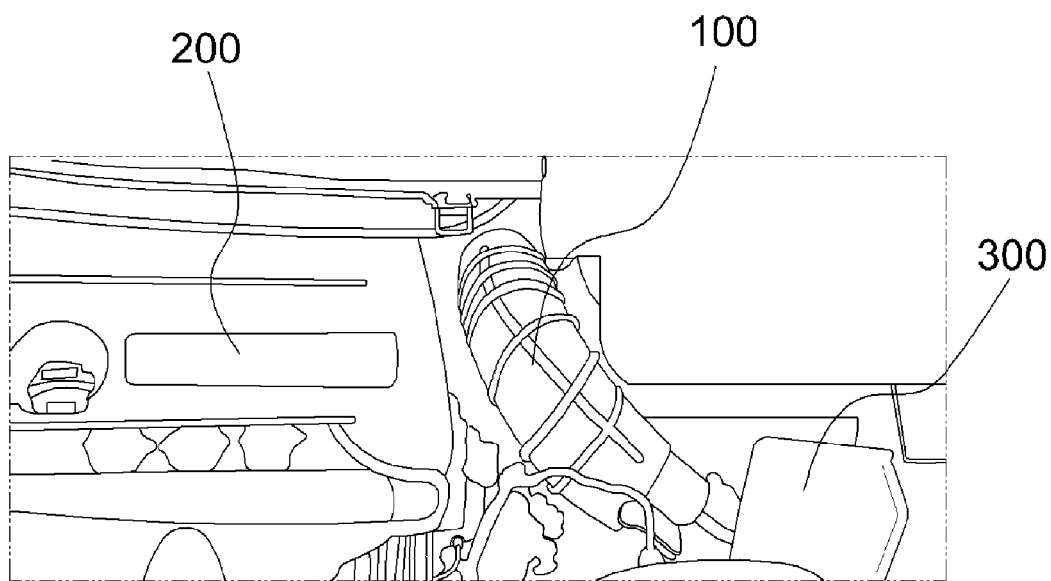
FIG. 1 is a photographic image of an exemplary air intake hose according to an exemplary embodiment of the present invention.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings. Prior to this, terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. Accordingly, the exemplary embodiment described in the present specification and the constitution illustrated in the drawings are exemplary embodiments of the present invention but do not represent all technical spirits of the present invention. Therefore, it should be understood that there are various equivalents and modifications replacing the embodiments at the time of filing of the present application.

Generally, an air intake hose equipped in an engine room of a vehicle is a part for transporting air suctioned from the exterior to an air filter or transporting filtered air from the air filter to a throttle body of a vehicle engine. In addition, the air intake hose can absorb vibration by the vehicle engine.

Figure 2:
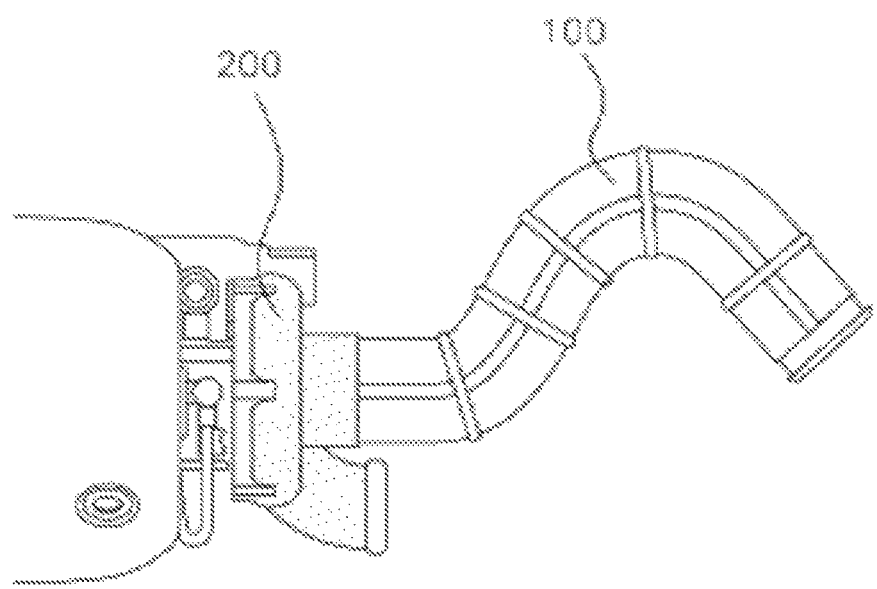
FIG. 2 illustrates an exemplary air intake hose according to an exemplary embodiment of the present invention.

For example, FIGS. 1 and 2 show exemplified views of an air intake hose and an air intake hose 100 may be connected between an engine 200 for vehicles and an air cleaner 300.

Accordingly, the air intake hose may be formed using a material for preventing a heat damage problem caused from a heat source of the engine. Particularly, for a diesel engine or a turbo charger engine, since engine heat is higher than the engine heat from a typical gasoline engine, it is essential to use a material that is not damaged by heat generated from the engines.

Accordingly, in the related art, conventional air intake hose material including, for example, a mixture such as a rubber, a thermoplastic elastomer (TPE), or polypropylene (PP), has been used. The PP or TPE material has been used due to reduced weight and low manufacturing cost, but that material can be damaged by the heat from high temperature engine and thus it is difficult to apply the material to the air intake hose.

In addition, an acrylate ethylene methyl (AEM) material has been used in the related art. However, since a weight and specific gravity itself are high, the AEM material may not be used as of the weight reduction material and the primary cost of the AEM material may be high.

Accordingly, the present invention provides a resin composition of an intake hose material for a vehicle turbo, thereby providing excellent durability, heat resistance, and elongation when the intake hose for the vehicle turbo is manufactured by overcoming the aforementioned technical limitation. For example, the resin composition may comprise polyamide 6, polypropylene, and olefin elastomer rubber, thereby form a POR resin.

The resin composition of the present invention may comprise polyamide 6, polypropylene, and the olefin elastomer rubber.

Further, a content of polyamide 6 may be from about 30 to 50 wt % based on the total weight of the resin composition, in order to secure rigidity and heat resistance when the air intake hose is manufactured from the POR resin.

A polyamide 6 resin commonly known as nylon 6 is a representative engineering plastic having excellent mechanical strength, wear resistance, and heat resistance, and is widely used in electric and electronic parts and vehicle parts and the like. Although the polyamide 6 has excellent strength, an absorption ratio thereof may be high, dimensional change may be significant, and thus dimensional stability may be insufficient.

The polyamide 6 resin used in the present invention may have a glass transition temperature of about 47° C., a heat distortion temperature (HDT) of about 75° C., and a melting temperature of about 220° C. A structure of a repeat unit of the aforementioned polyamide 6 resin may be presented by the following Chemical Formula 1.

[Chemical Formula 1]

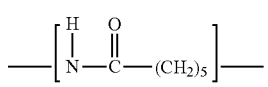

Meanwhile, the resin composition of the present invention may include polypropylene. Polypropylene has merits in that moldability, an electric insulation property, water resistance, chemical resistance, and the like are excellent, and specific gravity is low and thus polypropylene is light. However, polypropylene may not be sufficient to impact and may easily droop and shrinks at low temperatures.

Preferably, a content of polypropylene used in the present invention may be of about 10 to 20 wt % based on the total weight of the resin composition. When the content of the polypropylene is greater than about 20 wt %, the physical property and heat resistance may deteriorate.

The resin composition for the intake hose of the present invention may include the olefin elastomer rubber. The olefin elastomer rubber may be used to increase the elongation property of the material. Preferably, the olefin elastomer rubber may be included in a content of about 30 to 50 wt % based on the total weight of the resin composition. When the content is greater than about 50 wt %, an extrusion process may not be performed sufficiently, and thus moldability may be reduced.

In addition, the resin composition of the present invention as described herein may further include an antioxidant. The antioxidant may include the phenol-based antioxidant and the phosphorus-based antioxidant, for example, the antioxidant may include a mixture of phenolic and phosphite.

The antioxidant may be used to suppress oxidation and deterioration reactions in extrusion and injection processing. Preferably, in the resin composition, the phenol-based and phosphorus-based antioxidants may be included as a mixture, and the content of the mixture may be of about 0.3 to 0.5 wt % based on the total weight of the resin composition. When the antioxidant is included in a content of less than about 0.3 wt %, physical properties of the material are reduced, and when the content is greater than about 0.5 wt %, appearance may deteriorate.

The resin composition as described herein may further include a sulfur-based heat resistance stabilizer. For example, a sulfur-based heat resistance stabilizer may be thioether or derivatives thereof.

The heat resistance stabilizer, as used herein, may improve long-term heat resistance of the material, particularly for the material exposed to high temperatures. Preferably, the resin composition may include the sulfur-based heat resistance stabilizer in a content of about 1 to 2 wt % based on the total weight of the resin composition. When the heat resistance stabilizer is included in a content of less than about 1 wt %, a heat resistant aging property may be reduced, and when the content is greater than about 2 wt %, physical properties may be reduced and appearance of the formed intake hose may deteriorate.

The resin composition as described herein may further include an olefin-based lubricant.

The lubricant may improve fluidity and a release property of the resin. Preferably, the olefin-based lubricant may be included in a content of about 0.2 to 0.5 wt % based on the total weight of the resin composition. When the olefin-based lubricant is included in a content of less than about 0.2 wt %, fluidity and the release property may be reduced, and when the olefin-based lubricant is included in a content of greater than about 0.5 wt %, physical property and fusion strength may be reduced.

The resin composition as described herein may further include a master batch. The master batch may improve color stability and extrusion process workability. For example, carbon black and dye black may be used while being mixed by a publicly known ratio and method. However, when the master batch is included in a content of greater than about 2 wt %, physical properties of the resin composition may be reduced, and thus it is preferable that the master batch is included in a content of about 1 to 2 wt %.

EXAMPLE

The following Table 1 includes constitutional components and weight ratios of the resin compositions for the intake hose according to Comparative Examples and an Example, and the following Table 2 exhibits evaluation results of physical properties of the resin compositions for the intake hose according to the Comparative Examples and the Example.

TABLE 1

| Classification | | Comparative Example 1 (wt %) | Comparative Example 2 (wt %) | Comparative Example 3 (wt %) | Example (wt %) |
|---|---|---|---|---|---|
| Resin | Polyamide 66 | 40 | — | — | — |
| | Polyamide 6 | 7.6 | 25 | 30 | 40 |
| | Polypropylene | — | 23.4 | 26.4 | 16.4 |
| Olefin elastomer rubber | | 50 | 50 | 40 | 40 |
| Antioxidant | Phenol-based | 0.2 | 0.2 | 0.2 | 0.2 |
| | Phosphorus-based | 0.2 | 0.2 | 0.2 | 0.2 |
| Heat resistance stabilizer | | — | 1 | 1 | 1 |
| Lubricant | | 0.3 | 0.2 | 0.2 | 0.2 |
| Master batch | | 1.7 | 2 | 2 | 2 |

TABLE 2

| Item | Experiment method (ASTM) | Unit | Comparative Example 1 | Comparative Example 2 | Comparative Example 3 | Example | Required level |
|---|---|---|---|---|---|---|---|
| Specific gravity | D792 | — | 0.99 | — | 0.95 | 0.97 | 1.0 to 2.0 |
| Tensile strength | D638 | MPa | 18.6 | — | 15 | 18 | 15 or more |
| Flexural strength | D790 | MPa | 14 | — | 4 | 9 | 8 or more |
| Flexural modulus | D790 | MPa | 418 | — | 153 | 265 | 200 or more |

As shown in Tables 1 and 2, Comparative Example 1, as shown in Table 1, included polyamide 66 in a content of 40 wt % and polyamide 6 in a content of 7.6 wt %. As shown in Table 2, tensile strength of the Comparative Example 1 was evaluated to be 18.6 MPa, flexural strength was evaluated to be 14 MPa, and flexural modulus was evaluated to be 418 MPa. In comparison to Example according to an exemplary embodiment of the present invention, material moldability was substantially reduced.

As shown in Table 1, Comparative Example 2 included polyamide 6 in a content of 25 wt % and polypropylene in a content of 23.4 wt %. Softness and the elongation property of Comparative Example 2 was similar to Example according to an exemplary embodiment, but heat resistance and rigidity were substantially reduced. Further, since cutting after extrusion was not performed, physical properties were not evaluated.

As shown in Table 1, Comparative Example 3 included polypropylene in a content of 26.4 wt %. As shown in Table 2, tensile strength was evaluated to be 15 MPa, flexural strength was evaluated to be 4 MPa, and flexural modulus was evaluated to be 153 MPa. Extrusion workability was at a satisfactory level, however, rigidity was largely reduced as compared to the Example according to an exemplary embodiment.

On the contrary, Example according to an exemplary embodiment of the present invention, as shown in Table 1, polyamide 6 was used in a content of 40 wt %, polypropylene was used in a content of 16.4 wt %, and the olefin elastomer rubber was used in a content of 40 wt %. As shown in Table 2, specific gravity was evaluated to be 0.97, tensile strength was evaluated to be 18 MPa, flexural strength was evaluated to be 9 MPa, and flexural modulus was evaluated to be 265 MPa. Accordingly, it can be confirmed that extrusion workability and injection moldability are substantially improved, and simultaneously, the resin composition of the Example according to an exemplary embodiment of the present invention is suitable as the material for the intake hose for vehicles.

As described above, according to various exemplary embodiments of the present invention, the resin composition may comprise polyamide 6, polypropylene, and an olefin elastomer rubber. In addition, further includes an antioxidant, a heat resistance stabilizer, a lubricant, and/or a master batch. Accordingly, the resin composition of the intake hose material for the vehicle turbo may provide substantially improved durability, heat resistance, and elongation.

Using the resin composition of the intake hose material for the vehicle turbo of the present invention, mechanical rigidity and pressure resistant and cold resistant properties may be substantially improved, and specific gravity may be reduced as compared to the material in the related art thereby contributing to a weight reduction of parts and reducing a manufacturing cost.

As described above, the present invention has been described in relation to specific embodiments of the present invention, but the exemplary embodiments are only for illustration and the present invention is not limited thereto. Exemplary embodiments described may be changed or modified by those skilled in the art to which the present invention pertains without departing from the scope of the present invention, and various alterations and modifications are possible within the technical spirit of the present invention and the equivalent scope of the claims which will be described below.

What is claimed is:

1. A resin composition, comprising:
polyamide 6;
polypropylene;
an olefin elastomer rubber; an olefin-based lubricant; and
an antioxidant comprising a phenol-based antioxidant and a phosphorus based antioxidant,
wherein a content of polyamide 6 is of 30 to 50 wt % based on the total weight of the resin composition,
wherein a content of polypropylene is 10 to 20 wt % based on the total weight of the resin composition,
wherein a content of the olefin elastomer rubber is 30 to 50 wt % based on the total weight of the resin composition, wherein a content of the olefin-based lubricant is 0.2 to 0.5 wt % based on the total weight of the resin composition.

2. The resin composition of claim 1, wherein the polyamide 6 has a glass transition temperature of about 47° C., a heat distortion temperature (HDT) of about 75° C., and a melting temperature of about 220° C.

3. The resin composition of claim 1, wherein a content of the antioxidant is of 0.3 to 0.5 wt % based on the total weight of the resin composition.

4. The resin composition of claim 1, further comprising:
a sulfur-based heat resistance stabilizer.

5. The resin composition of claim 4, wherein the heat resistance stabilizer comprises thioether or derivatives thereof.

6. The resin composition of claim 4, wherein a content of the sulfur-based heat resistance stabilizer is of 1 to 2 wt % based on the total weight of the resin composition.

7. A vehicle part that comprises a resin composition of claim 1.

8. The vehicle part of claim 7 is an intake hose.

* * * * *